United States Patent
Kunz et al.

(10) Patent No.: US 11,382,458 B2
(45) Date of Patent: Jul. 12, 2022

(54) SKEWER ROTATION SYSTEM FOR A ROTISSERIE GRILL

(71) Applicants: Guilherme Kunz, Reunion, FL (US); Gilberto Lucas, Denver, CO (US)

(72) Inventors: Guilherme Kunz, Reunion, FL (US); Gilberto Lucas, Denver, CO (US)

(73) Assignee: DASHEM BRANDS LLC, Casper, WY (US)

( * ) Notice: Subject to any disclaimer, the term of this patent is extended or adjusted under 35 U.S.C. 154(b) by 42 days.

(21) Appl. No.: 17/071,827

(22) Filed: Oct. 15, 2020

(65) Prior Publication Data

US 2022/0053974 A1 Feb. 24, 2022

Related U.S. Application Data

(60) Provisional application No. 63/068,086, filed on Aug. 20, 2020.

(51) Int. Cl.
*A47J 37/07* (2006.01)
*A47J 37/04* (2006.01)

(52) U.S. Cl.
CPC ......... *A47J 37/0745* (2013.01); *A47J 37/041* (2013.01)

(58) Field of Classification Search
CPC .. A47J 37/041; A47J 37/0629; A47J 37/0682; A47J 37/0704; A47J 37/0713; A47J 37/0731; A47J 37/0745; A47J 37/0763
USPC .............. 99/324, 334, 421 R, 421 A, 421 H, 99/421 HH, 421 MV, 421 M, 421 P, 448
See application file for complete search history.

(56) References Cited

U.S. PATENT DOCUMENTS

| | | | | |
|---|---|---|---|---|
| 2,754,401 A | * | 7/1956 | Edelman | A47J 37/041 99/332 |
| 5,168,798 A | * | 12/1992 | Kristofich | A47J 37/041 99/419 |
| 5,720,217 A | * | 2/1998 | Pappas | A47J 37/041 99/421 H |
| 6,439,109 B1 | * | 8/2002 | Rehill | A47J 37/041 99/421 H |
| 7,222,564 B2 | * | 5/2007 | Sekiya | A47J 37/041 99/421 H |
| 2009/0308262 A1 | * | 12/2009 | McGuigan | A47J 37/041 99/421 R |
| 2010/0059038 A1 | * | 3/2010 | Ho | A47J 37/0763 99/448 |
| 2010/0122630 A1 | * | 5/2010 | Nimerovskiy | A47J 37/041 99/421 H |
| 2012/0097046 A1 | * | 4/2012 | Jones | A47J 37/041 99/334 |

(Continued)

*Primary Examiner* — Hung D Nguyen
(74) *Attorney, Agent, or Firm* — Melvin K. Silverman

(57) ABSTRACT

A rotisserie cooking system and a skewer rotation system for a rotisserie cooking system having a plurality of independent motors that are capable of independent rotation of a plurality removable skewers. The system having a main body of sidewalls, top, bottom, door, and a heating element. The system is also capable of battery operation and variable adjustability for the motors of the system. The rotisserie cooking system also defining an interior cooking chamber and a mechanical components chamber wherein all components can operate under high-heat conditions. In some embodiments, a warming compartment exists in the top wall of the rotisserie cooking system.

21 Claims, 22 Drawing Sheets

(56) References Cited

U.S. PATENT DOCUMENTS

2012/0186461 A1\* 7/2012 Carson ................ A47J 37/0763
99/421 H

\* cited by examiner

SKEWER ROTATION SYSTEM FOR A ROTISSERIE GRILL

CROSS-REFERENCE TO RELATED APPLICATIONS

This application claims the benefit under 35 USC 119(e) to U.S. Provisional Patent Application Ser. No. 63/068,086 filed Aug. 20, 2020. All prior related patents and patent applications are herein incorporated by reference in their entirety.

TECHNICAL FIELD OF THE INVENTION

The present invention belongs to the field of rotisserie cooking systems.

BACKGROUND OF THE INVENTION

Rotisserie cooking, also known as spit roasting, has existed for hundreds of years. Rotisserie systems involve use of a skewer, or spit, to slowly turn the impaled food over a fire or heating element. The continuous turning allows the food to cook evenly in its own juices.

Rotisserie cooking systems have taken many forms over the years, including manual rotisserie systems, such as U.S. Pat. No. 1,337,122, which uses heating element, wherein a user will turn a handle that rotates the skewer, to U.S. Pat. No. 1,442,584, which includes a handle that turns gears allowing a single handle to turn multiple skewers.

Mechanical means have been developed for users who prefer to set the system up and come back when the cooking has finished. Typically this involves a single motor spinning gears, such as U.S. Pat. No. 8,122,817 or a chain to rotate the skewers. However, these systems typically operate as permanent appliances, and are not designed for the ability to be portable.

To make a mechanical system portable provides several challenges, including how the skewers rotate, and whether or not the system can be adjusted for speed and power requirements if an outside power source is included. In order to optimize the system for portable use, a new system beyond what already exists in the prior art must be conceived, which is the subject of the invention herein.

SUMMARY OF THE INVENTION

The present invention discloses a skewer rotation system for a rotisserie cooking system, comprising a plurality of independent motor system assemblies horizontally mounted to a barrier wall of an inner cooking chamber of a rotisserie grill system, wherein each motor system assembly in the plurality of motor system assemblies is mounted to the barrier wall by a bracket spacing each motor system from direct contact to the barrier wall, anchoring each motor system assembly axially horizontal. Each of the motor system assemblies have a body, wherein the body incorporates a motor, horizontal motor shaft, gear assembly, rotatable connecting shaft, and a cylindrical skewer engagement couple engaged with the rotatable connecting shaft.

The barrier wall includes a plurality of apertures to allow the cylindrical skewer connector to extend through the aperture to allow engagement of each motor system assembly with a complimental skewer.

The present invention further provides a rotatable connecting shaft extending horizontally from the gear assembly, extending into the inner cooking chamber, beyond each of the apertures in the plurality of apertures in the barrier wall, wherein each of the rotatable connecting shafts is capped with the cylindrical skewer engagement couple.

Each of the motor system assemblies in the plurality of motor system assemblies is mounted on an exterior side of the barrier wall of the inner cooking chamber of the rotisserie grill system.

The present invention further discloses a rotisserie cooking system, comprising a main rotisserie cooking system body defining an inner cooking chamber and an enclosed mechanical components chamber. The inner cooking chamber has sidewalls, top and bottom walls, a front door, and a barrier wall separating the cooking chamber and the enclosed mechanical chamber. The invention also contains a heating element, a plurality of removable skewers and a skewer rotation system having a plurality of independent motor system assemblies horizontally mounted to the barrier wall of the inner cooking chamber of the rotisserie grill system, wherein each motor system assembly in the plurality of motor system assemblies is mounted to the barrier wall by a bracket spacing each motor system from direct contact to the barrier wall, anchoring each motor system assembly axially horizontal.

Each of the motor system assemblies has a body, wherein the body incorporates a motor, horizontal motor shaft, gear assembly, rotatable connecting shaft, and a cylindrical skewer engagement couple engaged with the rotatable connecting shaft. The barrier wall includes a plurality of apertures to allow the cylindrical skewer connector to extend through the aperture to allow engagement of each motor system assembly with a complimental skewer. The rotatable connecting shaft extends horizontally from the gear assembly, extending into the inner cooking chamber, beyond each of the apertures in the plurality of apertures in the barrier wall, wherein each of the rotatable connecting shafts is capped with the cylindrical skewer engagement couple. Each of the motor system assemblies in the plurality of motor system assemblies mounted on an exterior side of the barrier wall of the inner cooking chamber of the rotisserie grill system.

It is an object of the present invention to provide a motor system for a rotisserie grill system with independently operable motors.

It is further an object of the present invention to provide a motor system for a rotisserie grill system with reduced operating noise.

It is also an object of the present invention to provide a motor system for a rotisserie grill system that provides each skewer its own independent motor.

It is another object of the present invention to provide a motor system for a rotisserie grill system that is capable of battery power.

It is yet further an object of the present invention to provide a motor system for a rotisserie grill system that has a higher ease of replacement and repair.

DETAILED DESCRIPTION OF THE INVENTION

The inventive rotisserie cooking system operates by allowing a user variable control over the cooking mechanism to allow for greater utilization of the cooking system. It does this by incorporating a plurality of independent motors to turn skewers with the possibility of different rates of speed or to shut off rotation completely. The system is broadly shown in FIGS. 2, 3A, and 3B, as described below.

The inventive rotisserie cooking system differs from other rotisserie cooking systems of the past in numerous ways. For example, rotisserie systems have existed for hundreds of years, where the food, typically meat and vegetables, were impaled on a skewer, and roasted over an open fire. A person would then rotate the skewered food by hand to achieve an evenly cooked food item. This technique has continued, with the most common use of rotisserie cooking is with an attachment for a user's grill, and with a manual means of rotating the skewers.

Although rotisserie systems have branched in to their own category of appliance, these systems are typically permanent fixtures in a home, requiring a dedicated fuel source and connection, and a power outlet if used with mechanical rotating elements.

This system disclosed herein offers numerous benefits over the prior art, primarily through its use of a multiple motor system (which can be seen in FIGS. 3A, 3B, 11, 14, and 15). The system allows users the possibility of variable control over the motors, which may allow users to control one or more motors at different speeds from other motors in the same system. In addition, users can shut off certain motors all together. This feature also uses less energy. When a skewer is not needed, a user can shut off power to the motor, or group of motors, so there is no draw needed to power that skewer to rotate. The lessened energy requirements thereby allow the system to work as battery operated in some embodiments.

Figure 1A:
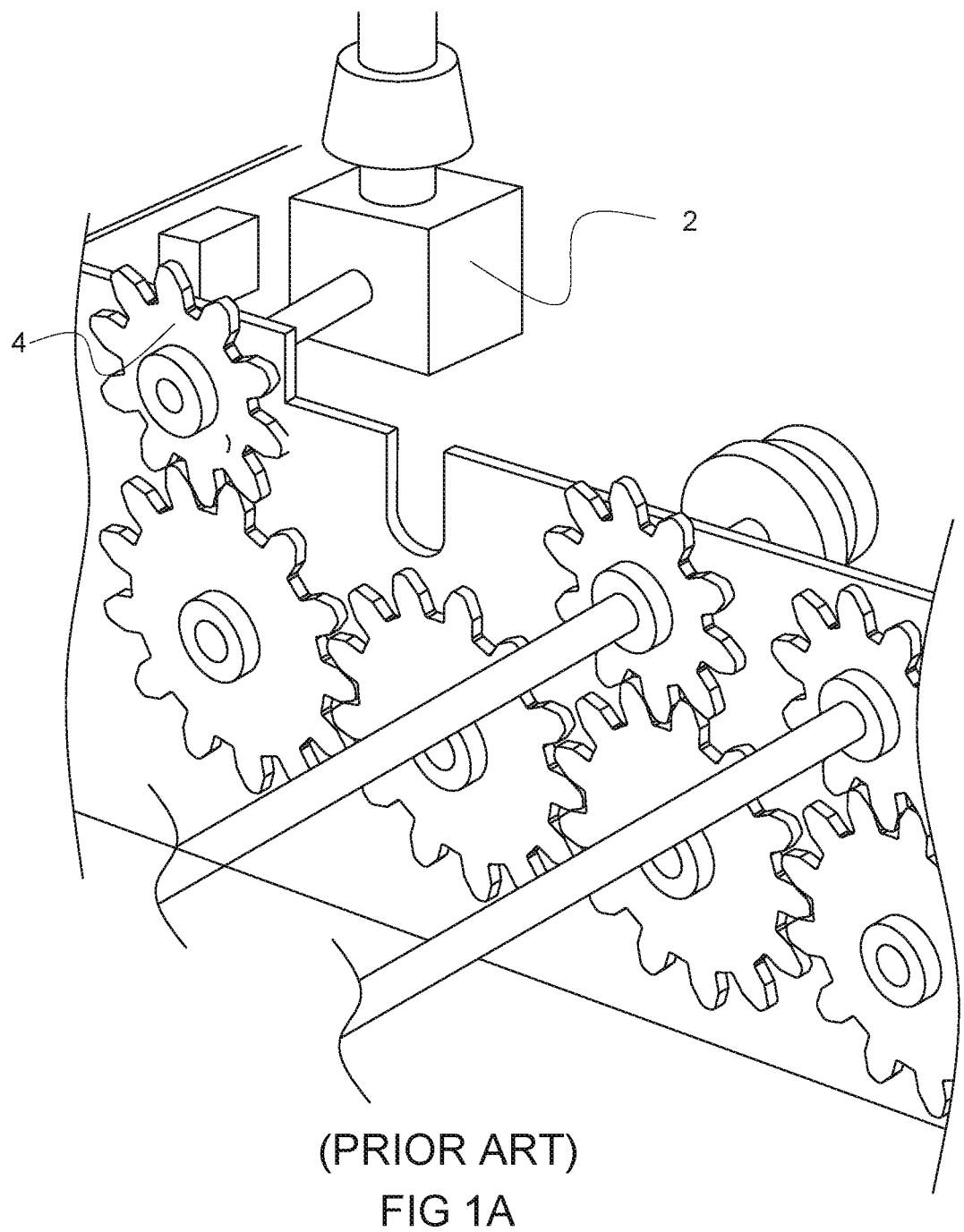
FIGS. 1A, 1B, and 1C are perspective images of the prior art.
Figure 1B:
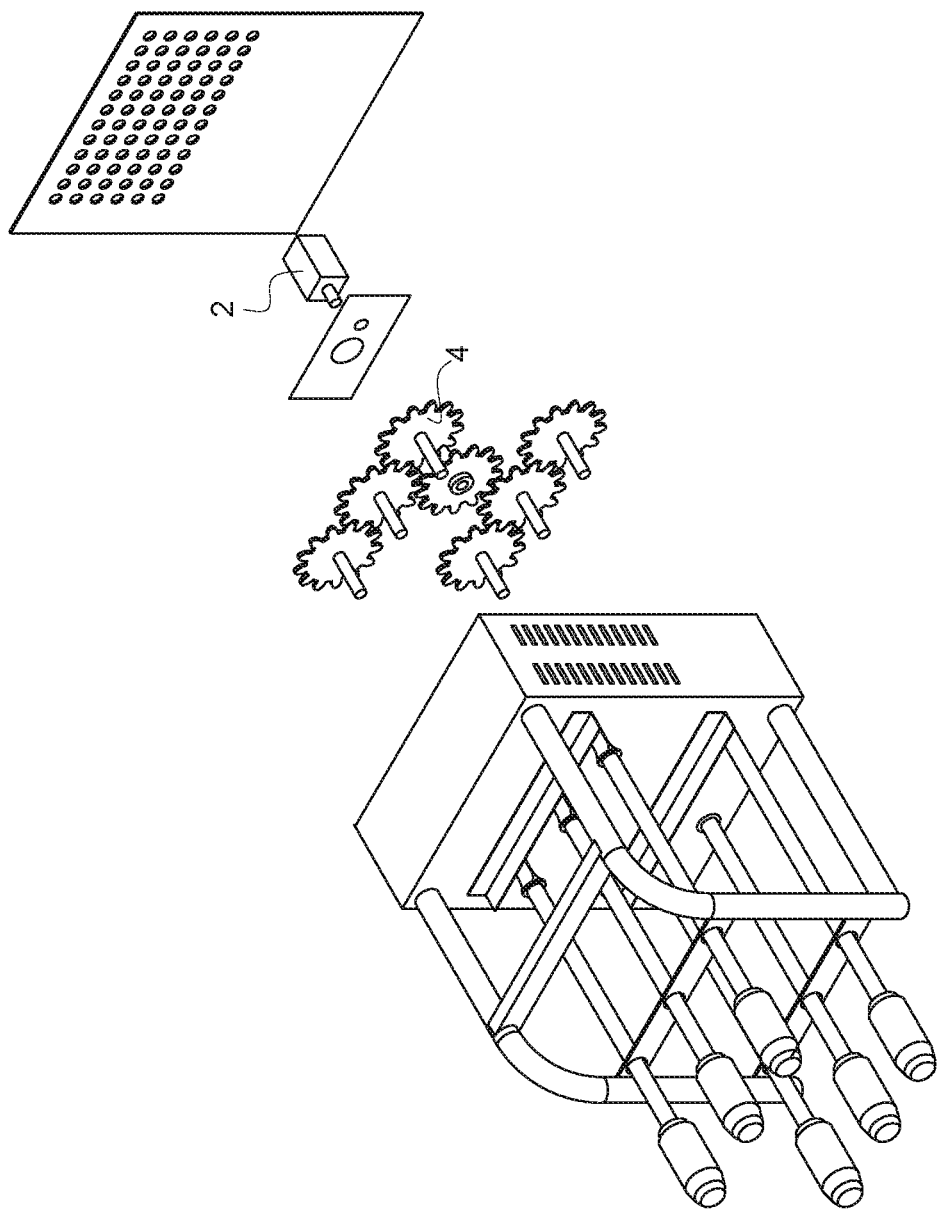
Figure 1C:
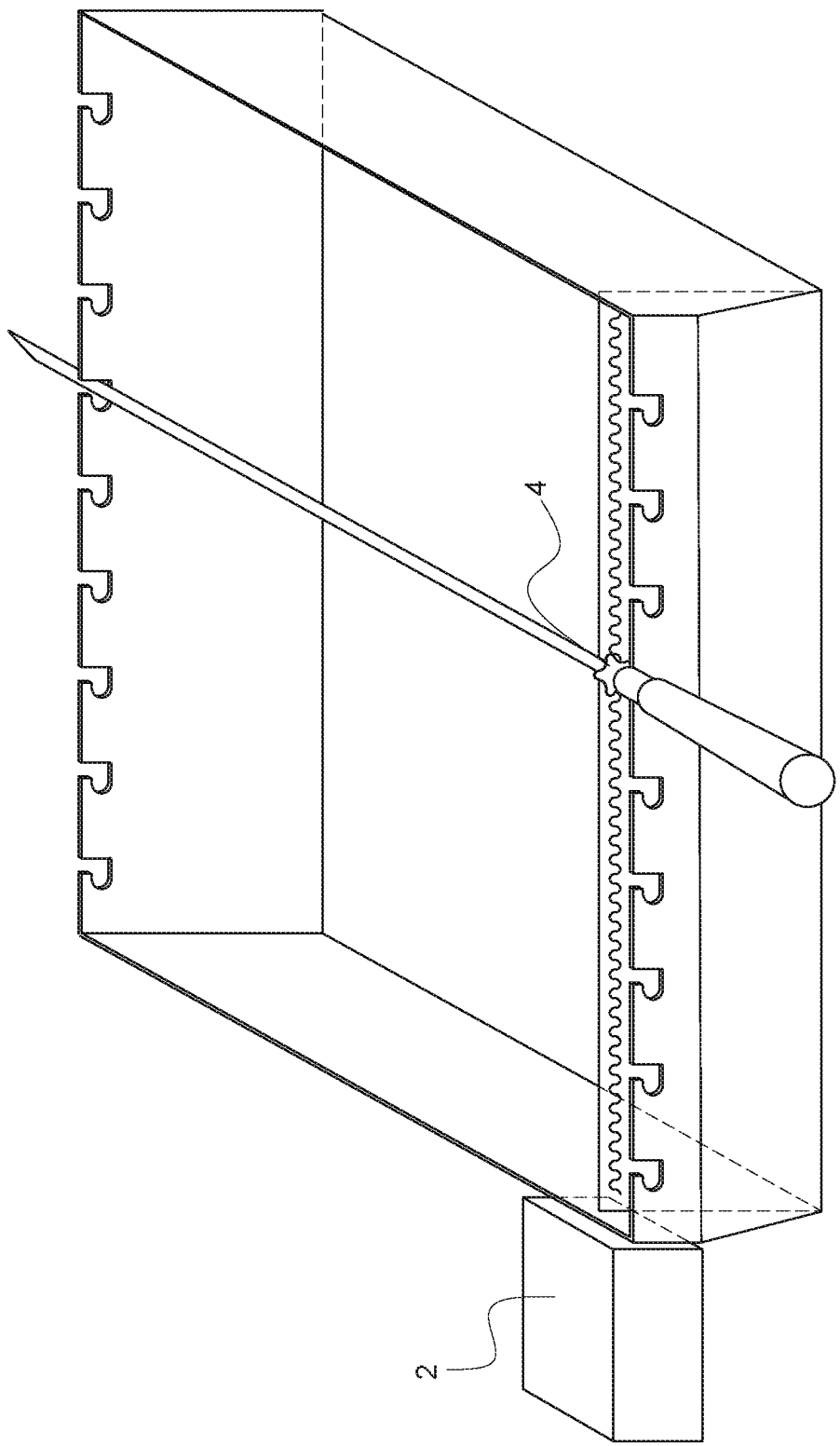

In addition, the variable speed allows different foods to be cooked. Foods that have more juices escaping from the food item can rotate at a faster rate reducing drip from the food item, and foods that have less juice escaping can rotate at a slower rate. This functionality is not allowed by current and prior systems because their structures include either gears or a chain drive system to rotate each skewer from one single motor at the same constant speed. These systems of the prior art can be seen primarily in FIGS. 1A (U.S. Pat. No. 8,122,817), 1B (U.S. application Ser. No. 2015/0144010), and 1C (U.S. Pat. No. 7,715,744).

The use of a plurality of motors of the type described herein also allow for maximum portability. Because motors may be shut off to conserve energy, a rechargeable battery can be used as a power source. For example, a family can bring this rotisserie cooking system to a park for a barbeque with friends, attach a fuel tank (such as a propane tank), and switch the unit on so that the motors are rotating under power from the battery.

Further, while the system allows for portability, it is also designed to work within a home setting. One simply needs to connect to a fuel source, and plug the system in to a power outlet, and the system is ready for use, both indoors and outdoors. Use of a plurality of motors, such as in the disclosed system herein, also reduces noise from the rotisserie cooking system, which can become a nuisance with other systems when used in the home.

In addition, the use of multiple motors ensures that at least one of the motors is operable at all times, and if one motor should fail, the entire system does not become unusable. This also makes ease of replacement easier as the system components, described below, are largely self-contained and easily removable and swappable.

Figure 2:
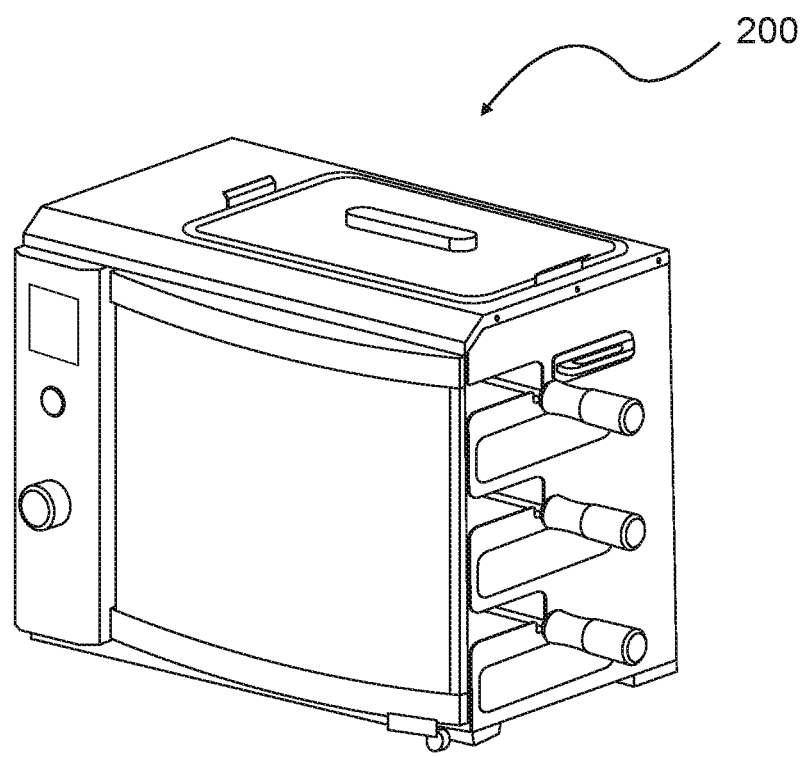
FIG. 2 is a perspective view of the rotisserie system.

FIG. 2 is a perspective view of the rotisserie system 200.

Figure 3A:
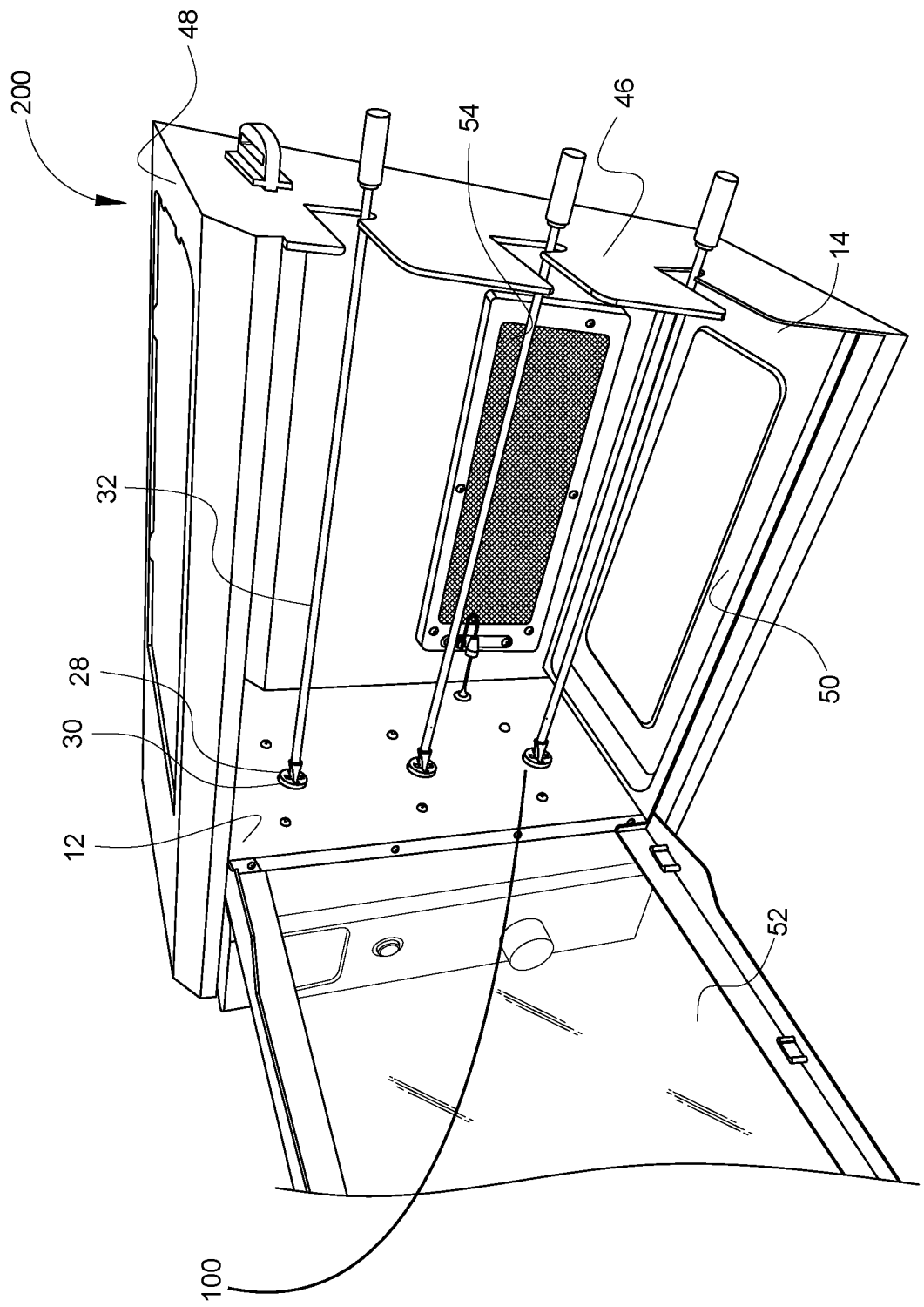
FIG. 3A is the rotisserie system with an open door showing the inner chamber with skewers.
Figure 3B:
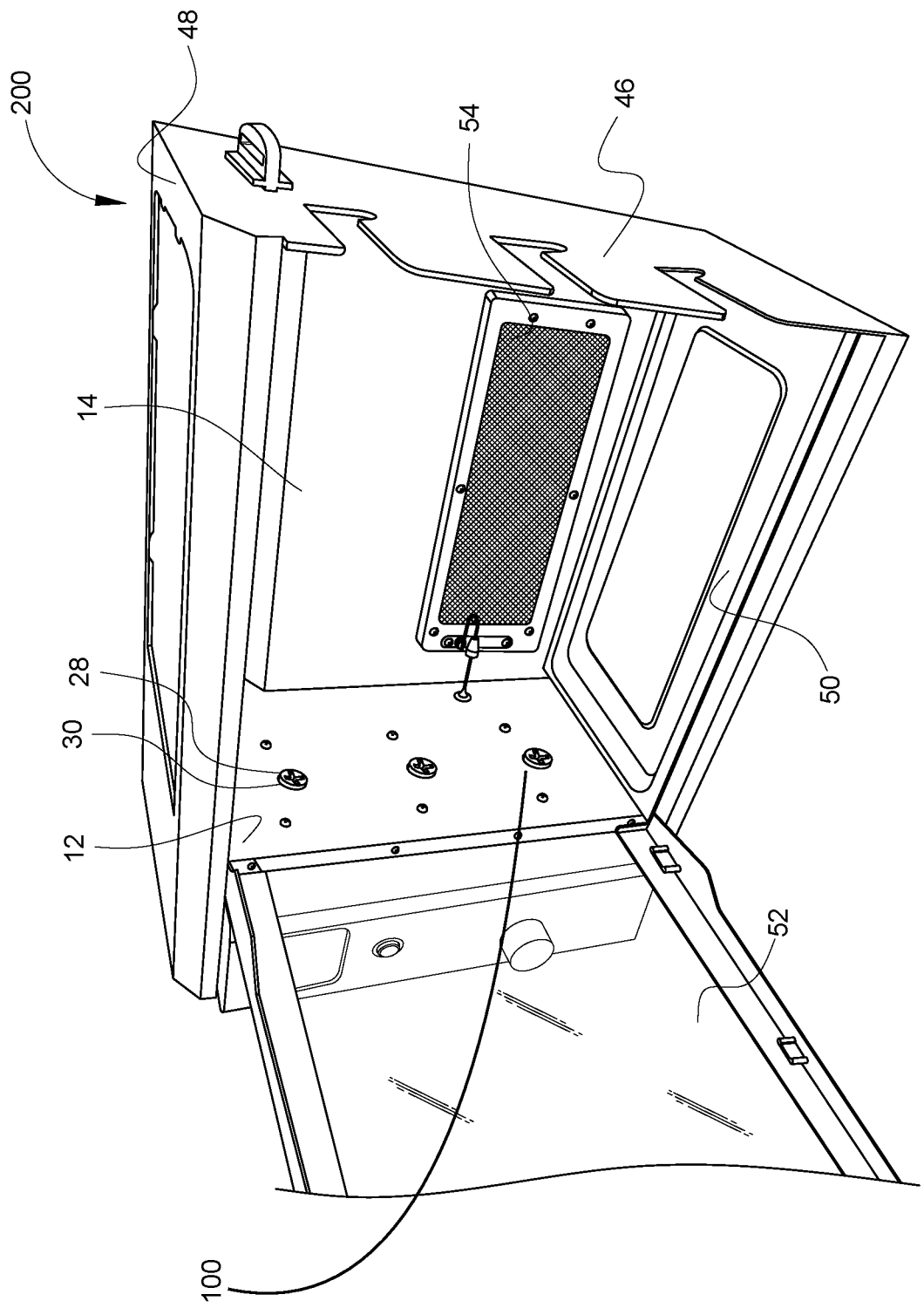
FIG. 3B is the rotisserie system with an open door showing the inner chamber without skewers.

FIG. 3A is the rotisserie system with an open door showing the inner chamber with skewers. FIG. 3B is a view the rotisserie system similar to FIG. 3A with an open door, but showing the inner chamber without skewers. As seen in FIGS. 3A and 3B, the rotisserie system 200 can be seen, also showing the door 52, inner cooking chamber 14, made up of sidewalls 46, bottom wall 50, barrier wall 12, and top wall 48. As may be noticed, cylindrical skewer engagement couples 28 can be seen extending through apertures 30 in the barrier wall 12. Skewers 32 can be seen engaging with the couple 28, wherein the couples 28 have a complemental female receiving opening wherein a skewer may fit, as more particularly seen in FIGS. 8B, 11, and 12. Also shown in FIG. 3A is the heating element 54.

Figure 4A:
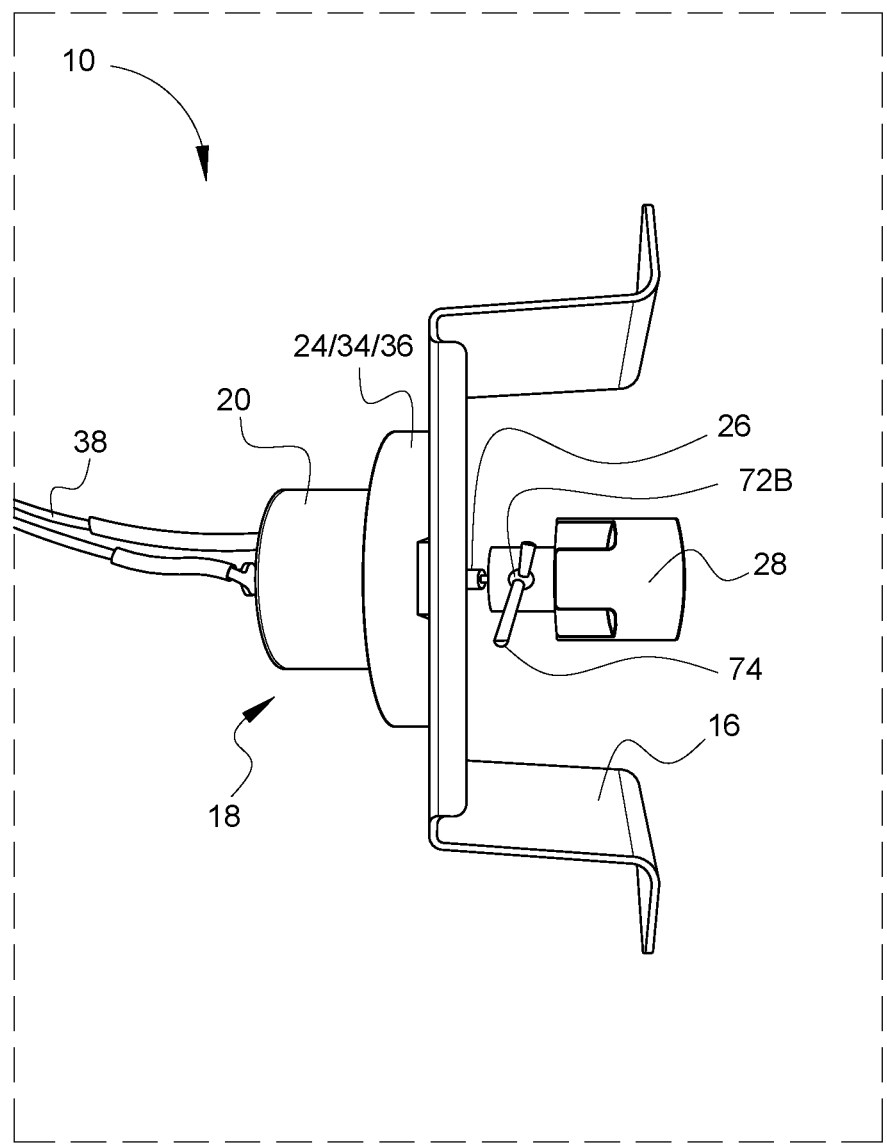
FIG. 4A is a side view of the motor system assembly with mounting bracket.
Figure 4B:
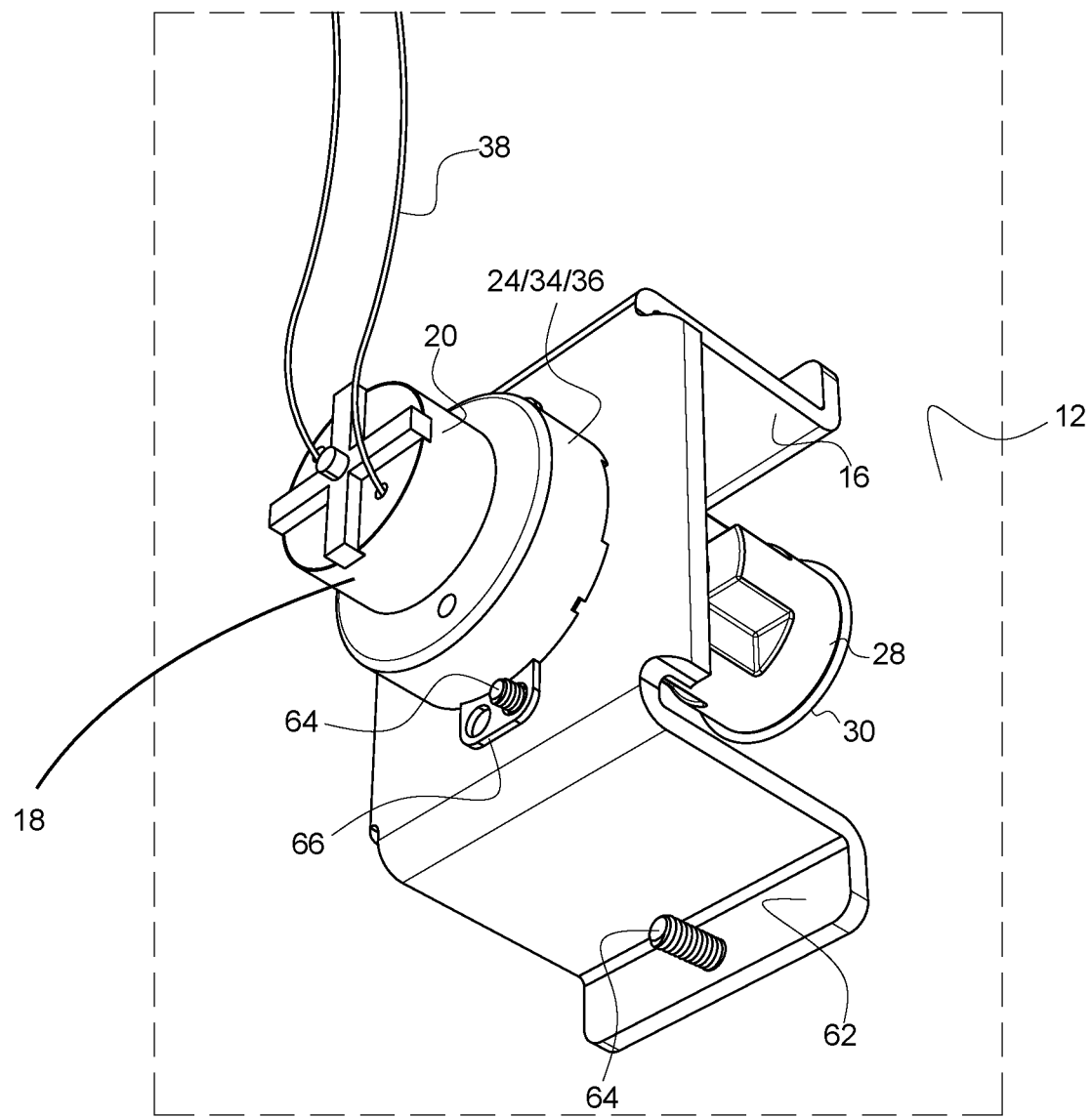
FIG. 4B is a perspective view of the motor system assembly with mounting bracket.
Figure 5:
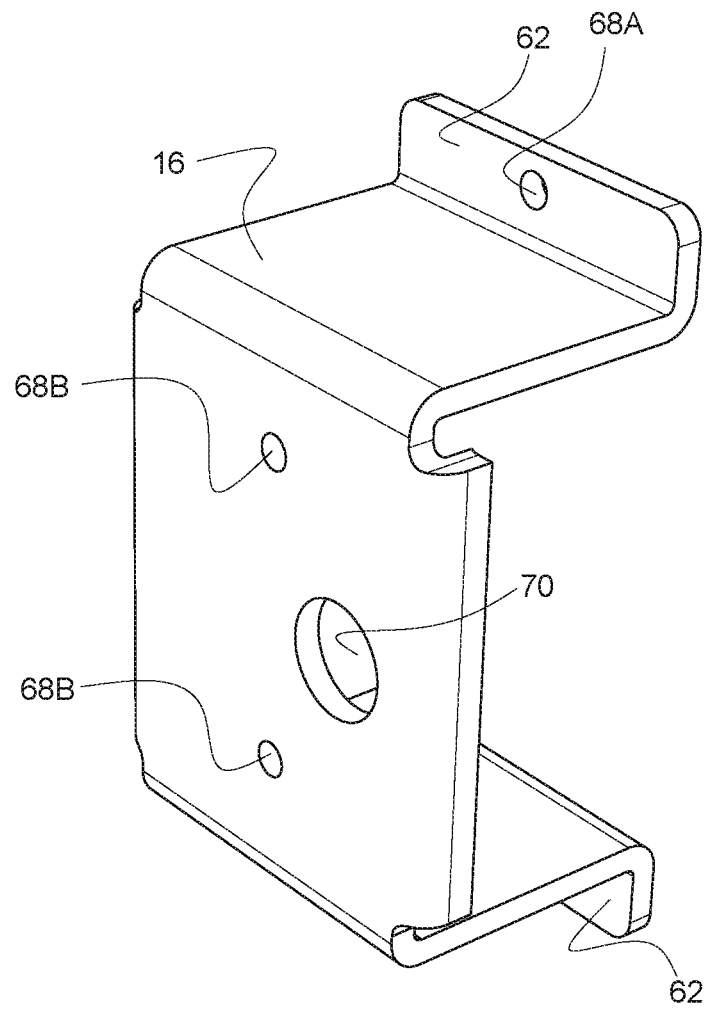
FIG. 5 is a perspective view of the motor system assembly mounting bracket.

FIG. 4A is a side view of the motor system assembly with mounting bracket. FIG. 4B is a perspective view of the motor system assembly with mounting bracket. As may be seen in FIGS. 4A and 4B, motor 20 is connected to gear assembly 24, enclosed in the gear assembly enclosure 34. The gear assembly enclosure 34 also contains mounting flanges 66, wherein a set of mounting screws 64 secure the assembly 10 to the mounting bracket 16. The side-view, as shown in FIG. 4A, also contains a view of the cylindrical skewer engagement couple 28 connecting to the rotatable connecting shaft 26, which is driven by the gear assembly 24. The rotatable connecting shaft 26 extends through an aperture 70 (shown in FIG. 5) of the bracket 16. FIG. 5 is a perspective view of the motor system assembly mounting bracket 16, which also contains mounting holes 68B and 68A.

The cylindrical skewer engagement couple 28 is connected to the rotatable connecting shaft 26 by inserting a pin 74 through the aperture 72B of the cylindrical skewer engagement couple 28 and aperture 72 (shown in FIG. 6) of the rotatable connecting shaft 26, when aligned. Also shown in FIG. 4B is the bracket 16 mounted to the barrier wall 12, wherein the cylindrical skewer engagement couple 28 extends through the barrier wall 12 aperture 30. The bracket 16 secures to the barrier wall 12 by way of flanges 62 that are affixed to the barrier wall 12 by a set of mounting screws 64. Also shown in the figures is the fire-resistant wiring 38.

Figure 6:
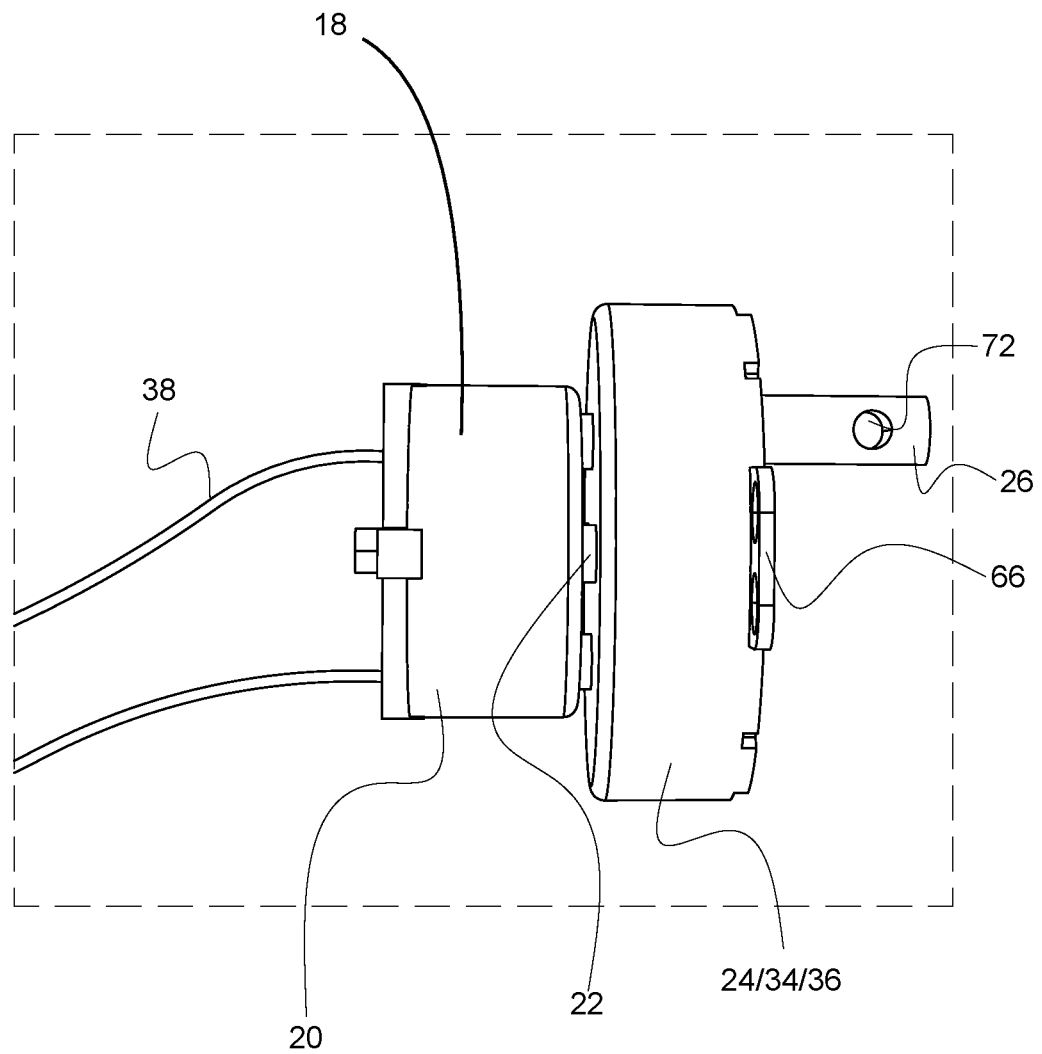
FIG. 6 is a side view of the motor system assembly.

FIG. 6 is a side view of the motor system assembly. The motor 20 is mounted to the gear assembly enclosure 34 of the gear assembly 24. The horizontal motor shaft 22 can be seen extending from the motor 20 through the gear assembly enclosure 34. The gears change the rotational speed of the rotatable connecting shaft 26, thereby allowing the shaft to spin at a slower speed with more power. As may be noticed, an aperture 72 also exists in the rotatable connecting shaft 26 to allow for the secured connection by way of a pin to the cylindrical skewer engagement couple. The motor 20 can also be seen connecting with flame-resistant wiring 38. Also shown is the connecting flange 66 for the gear assembly enclosure 34 to use in mounting the assembly 10, as shown in FIG. 4B.

Figure 7A:
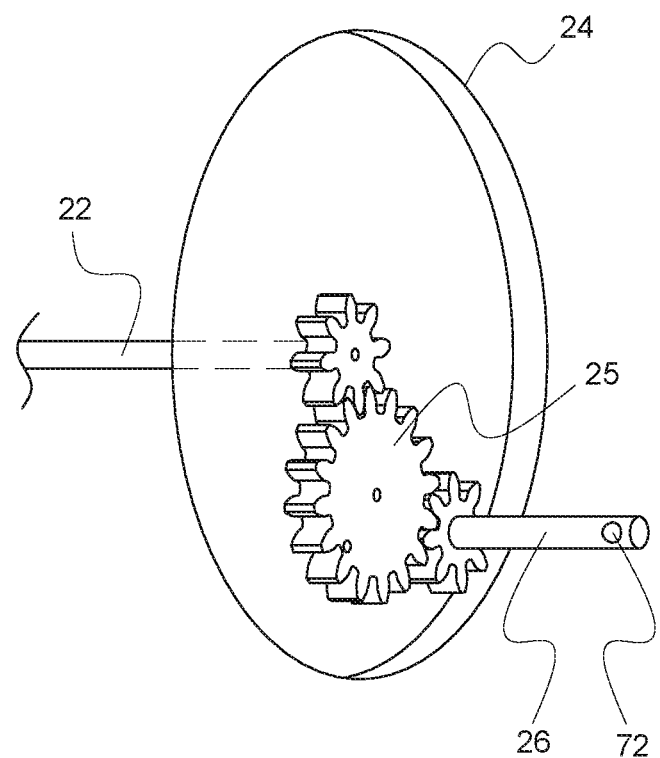
FIG. 7A is an internal perspective view of the gear system assembly.

FIG. 7A is an internal perspective conceptual view of the gear system assembly. As shown, there are several gears 25 inside the assembly 24 the help adjust the output of a motor 20. The motor shaft 22 spins at least one gear 25 in a plurality of gears, thereby turning connecting shaft 26 with aperture 72.

Figure 7B:
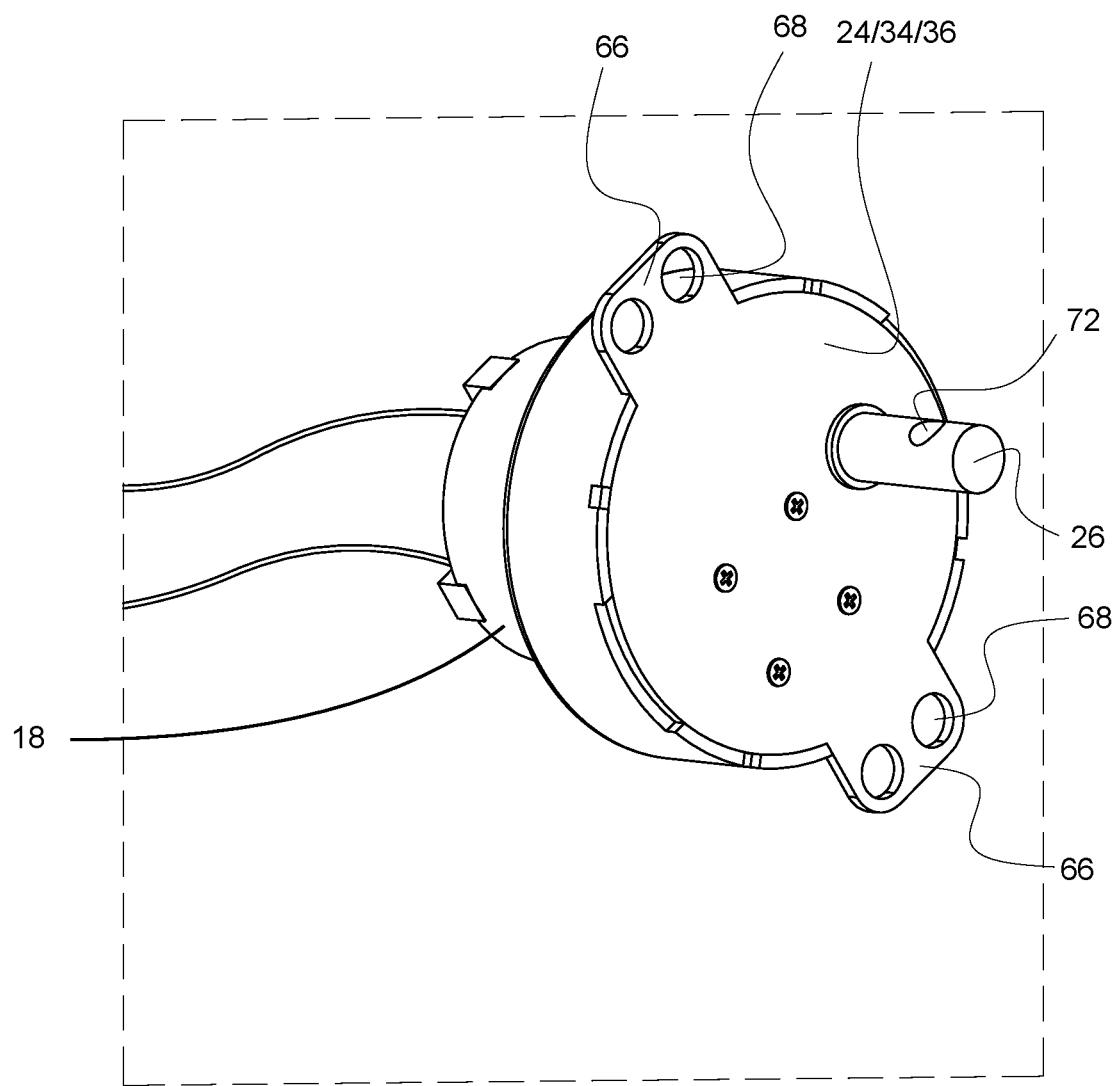
FIG. 7B is a perspective view of the gear system assembly.

FIG. 7B is a perspective view of the gear system assembly 24. The gear system assembly includes the enclosure 36, the rotatable connecting shaft 26 with an aperture 72. Mounting of the assembly may be accomplished by aligning the screw holes 68 of the flange 66 with the screw holes 68B on the bracket 16 (as shown in FIG. 5) and secure the two with mounting screws 64 (as shown in FIG. 4B).

Figure 8A:
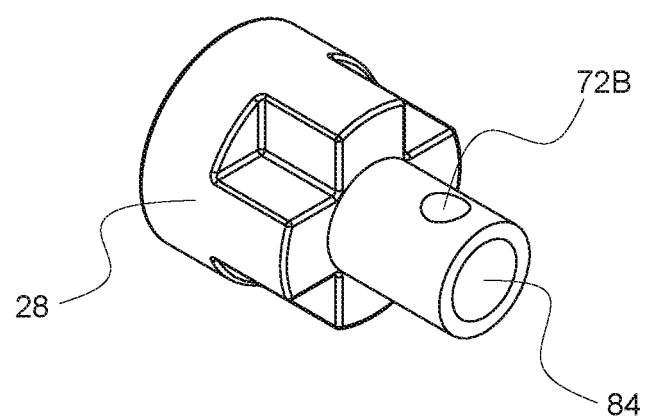
FIG. 8A is a perspective view of the cylindrical skewer engagement couple.
Figure 8B:
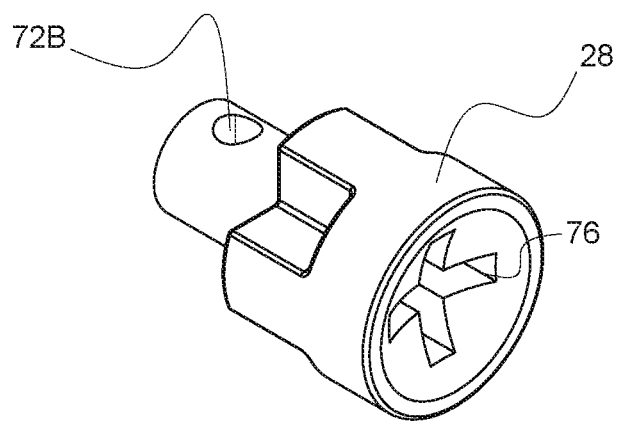
FIG. 8B is an opposing perspective view of the cylindrical skewer engagement couple.
Figure 8C:
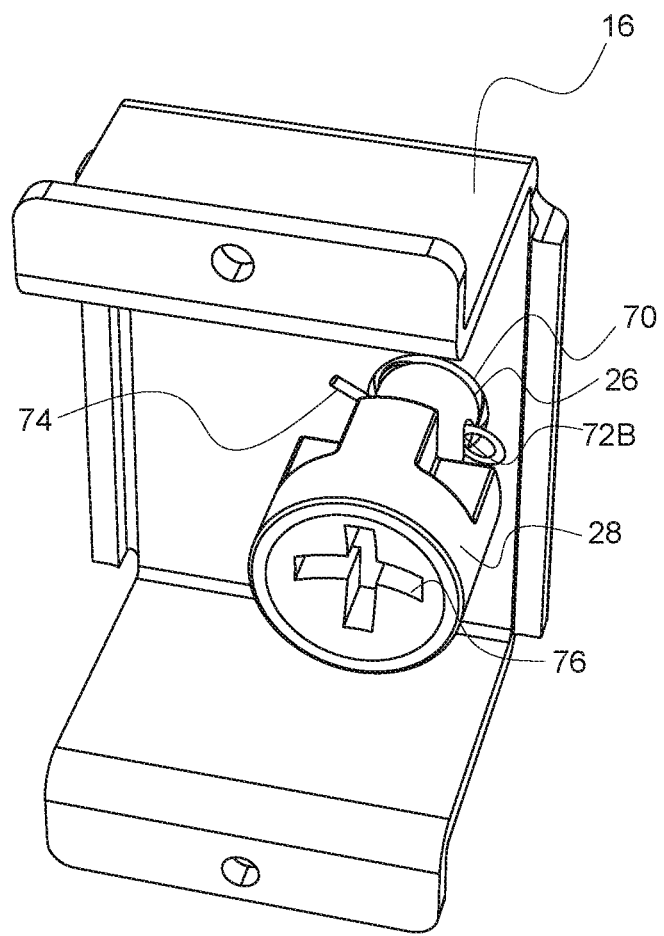
FIG. 8C is a perspective view of the cylindrical skewer engagement couple mounted to the motor system assembly.
Figure 11:
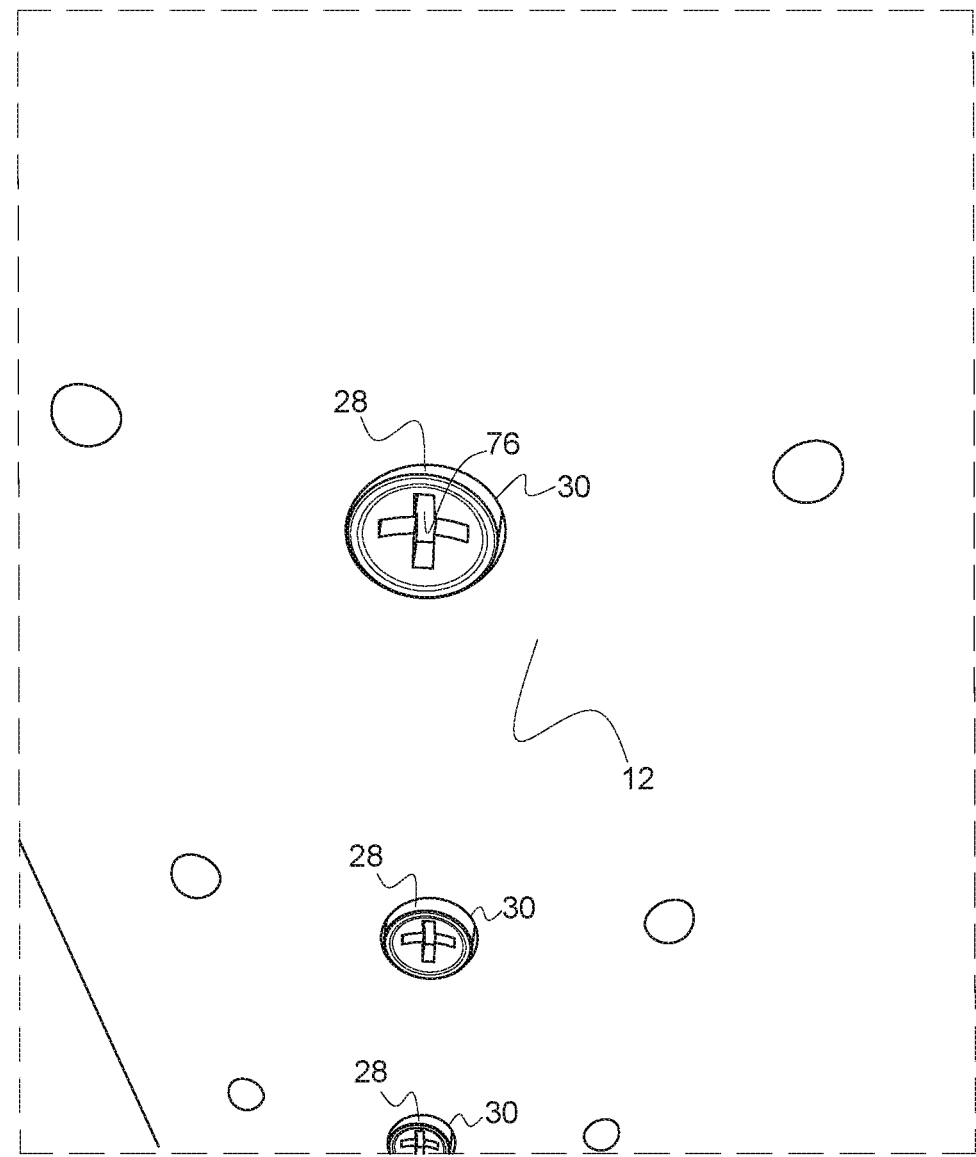
FIG. 11 is a perspective view of a plurality of motor system assemblies mounted to the barrier wall from the reverse side of the barrier wall shown in FIG. 10.
Figure 12:
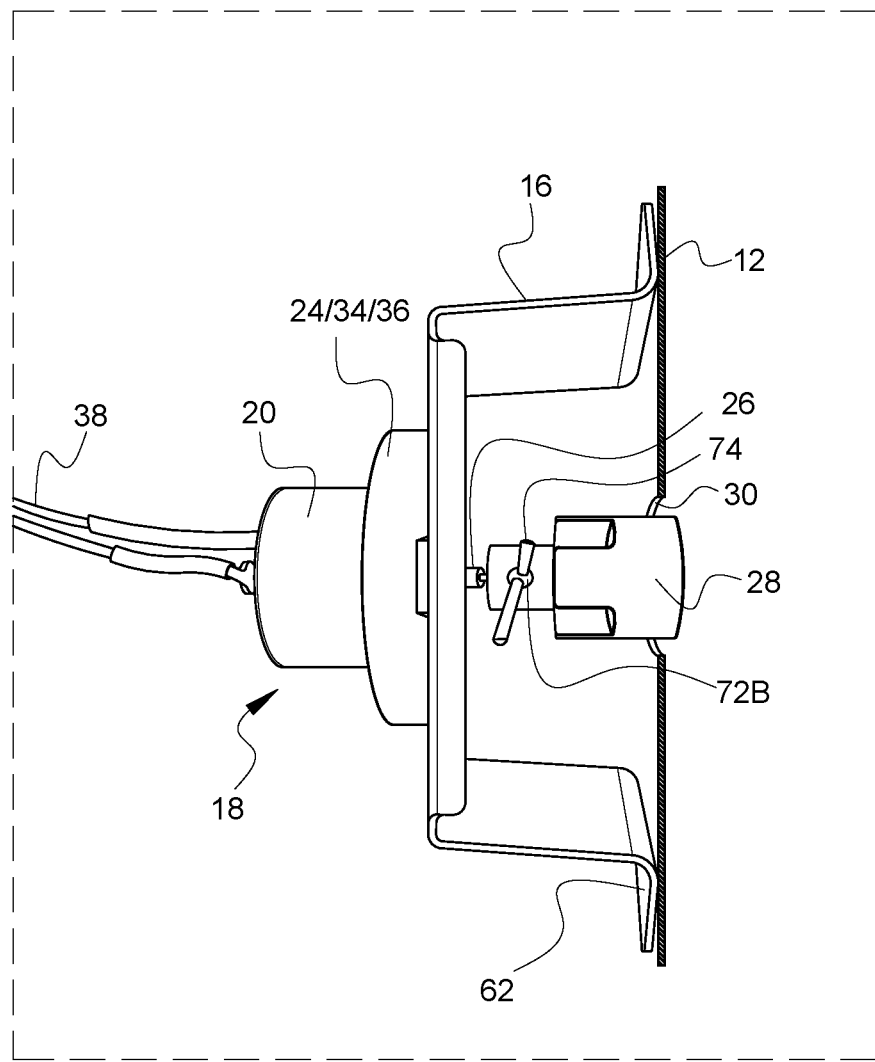
FIG. 12 is an elevation view showing a section cut of the barrier wall with a motor system assembly affixed thereof.

FIG. 8A is a perspective view of the cylindrical skewer engagement couple 28, FIG. 8B is an opposing perspective view of the cylindrical skewer engagement couple 28, and FIG. 8C is a perspective view of the cylindrical skewer engagement couple 26 mounted to the motor system assembly. FIG. 8A also shows the pin aperture 72B for use with a pin 74 in securement to the pin aperture 72 of the rotatable connecting shaft 26, as shown in FIG. 8C. Also shown in FIG. 8A is the female receiving end 84 of the cylindrical skewer engagement couple 28 for receiving the rotatable connecting shaft 26. FIG. 8C shows the rotatable connecting shaft 26 extending through aperture 70 of the bracket 16. FIGS. 8B, 8C, and 11 shows the cylindrical skewer engagement couple's female receiver 76 for a skewer. This is shown in a cross pattern for a flat male engagement end of the skewer. The engagement of the female receiving end 76 of the engagement couple 28 with a skewer 32 is shown more particularly in FIG. 12, a perspective view of the cylindrical skewer engagement couple 28 extending through an aperture 30 of the barrier wall 12 engaged with a skewer 32.

Figure 9:
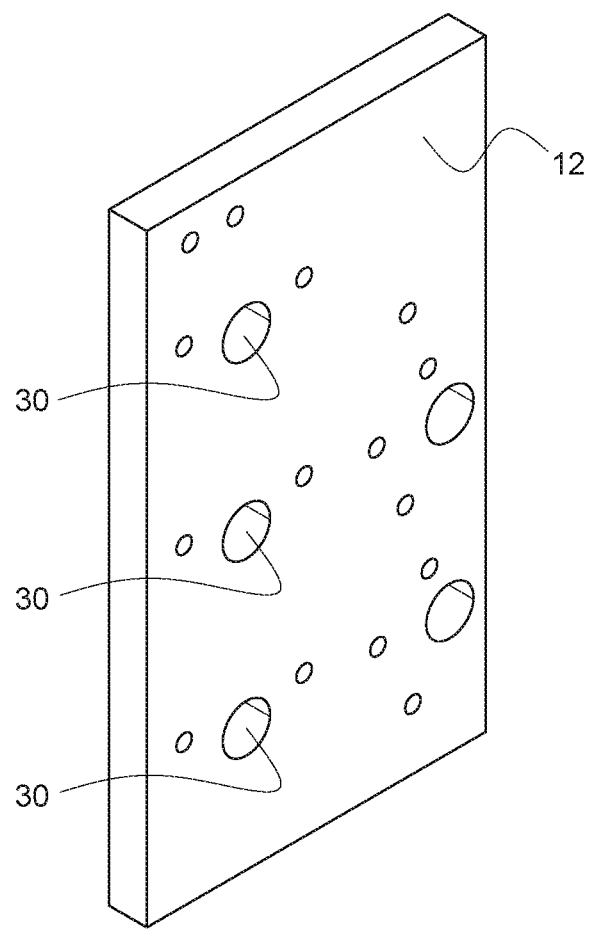
FIG. 9 is a perspective view of the barrier wall.
Figure 10:
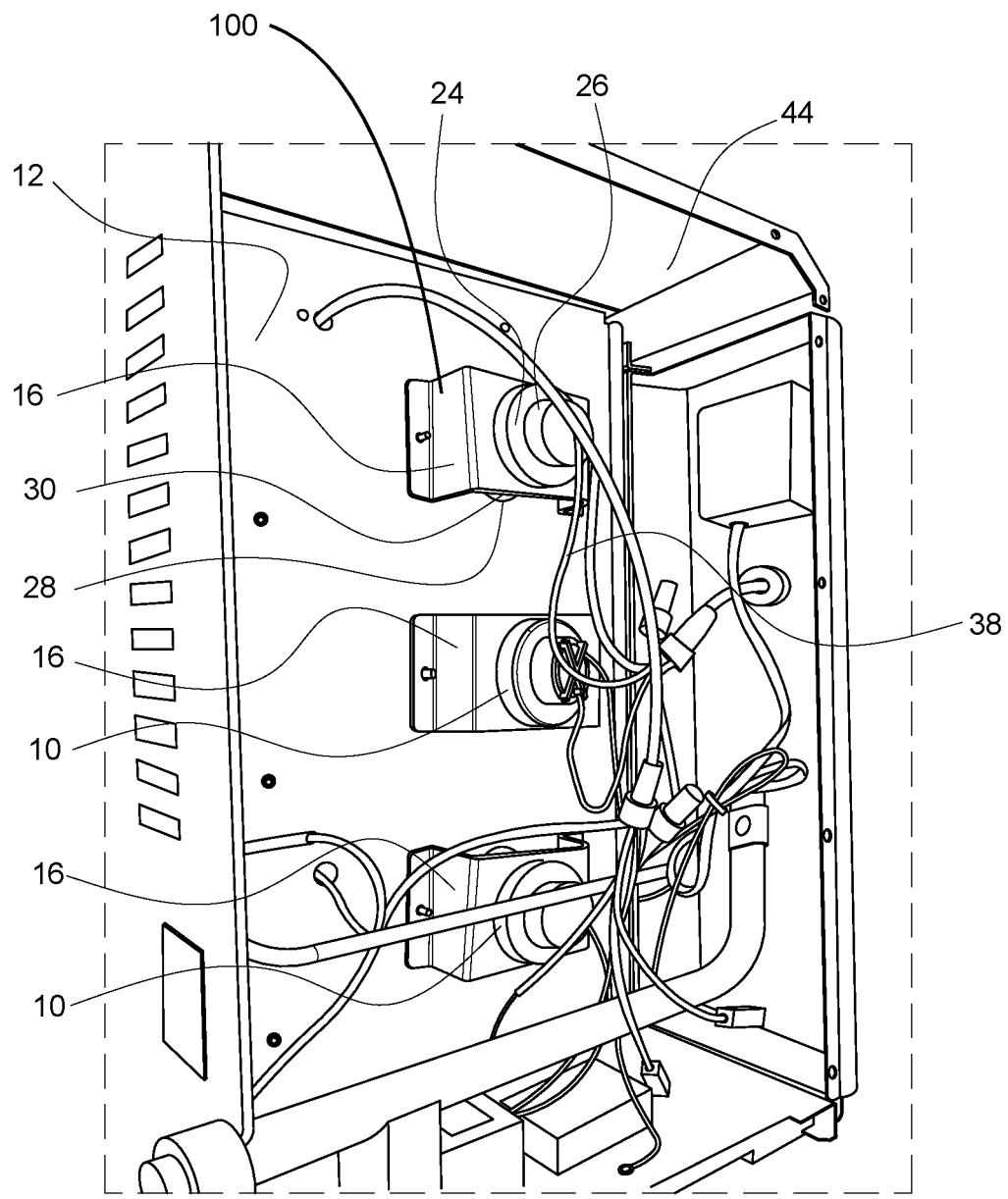
FIG. 10 is a perspective view of a plurality of motor system assemblies mounted to the barrier wall.

FIG. 9 is a perspective view of the barrier wall 12 showing a series of apertures 30 throughout the barrier wall 12. A series of cylindrical skewer engagement couples 28 can be seen extending through these apertures 30 in the barrier wall 12 in the perspective view of the plurality of motor system assemblies mounted to the barrier wall from the reverse side of the barrier wall shown in FIG. 10. As such, FIG. 10 is a perspective view of a plurality of motor system assemblies 10 mounted to the barrier wall 12 from the perspective of the mechanical components chamber 44. As can be seen in the view, the assemblies 10 include the motor 20, gear assembly 24, and cylindrical skewer engagement couples 28. Further, these cylindrical skewer engagement couples 28 can be seen extending through apertures 30. The mounting brackets 16 help secure the assemblies 10 to the barrier wall 12 and provide a buffer space. Flame-resistant wiring 38 can also be seen connecting the motors 20 to a power source.

Figure 13:
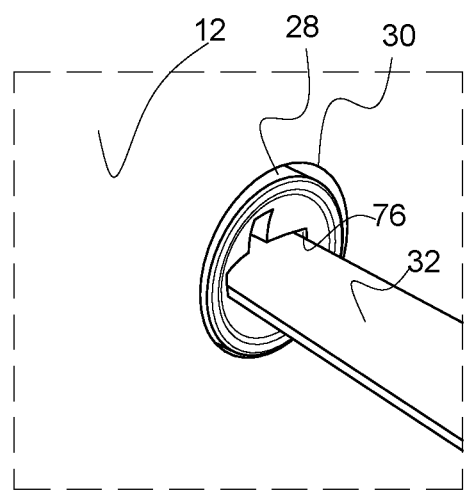
FIG. 13 is a perspective view of the cylindrical skewer engagement couple engaged with a skewer.

A more particular view showing the mounting of the assemblies 10 to the barrier wall 12 can be seen in FIG. 13, an elevation view showing a section cut of the barrier wall 12 with a motor system assembly 10 affixed thereof. The rotatable connecting shaft 26 can be seen extending through the bracket 16, which is mounted to the barrier wall 12. The bracket 16 contains flanges 62 for use in mounting the bracket 16 to the barrier wall 12. The assembly 10 can be seen comprising the motor 20, gear assembly 24, rotatable connecting shaft 26, and cylindrical skewer engagement couple 28. As may be appreciated, the cylindrical skewer engagement couple 28 is shown extending through the aperture 30 in the barrier wall 12. The connecting means of the cylindrical skewer engagement couple 28 are shown as a pin 74 extending through an aperture 72 securing the cylindrical skewer engagement couple 28 to the rotatable connecting shaft 26. The motor 20 can also be seen to include connections to flame-resistant wires 38.

Figure 14:
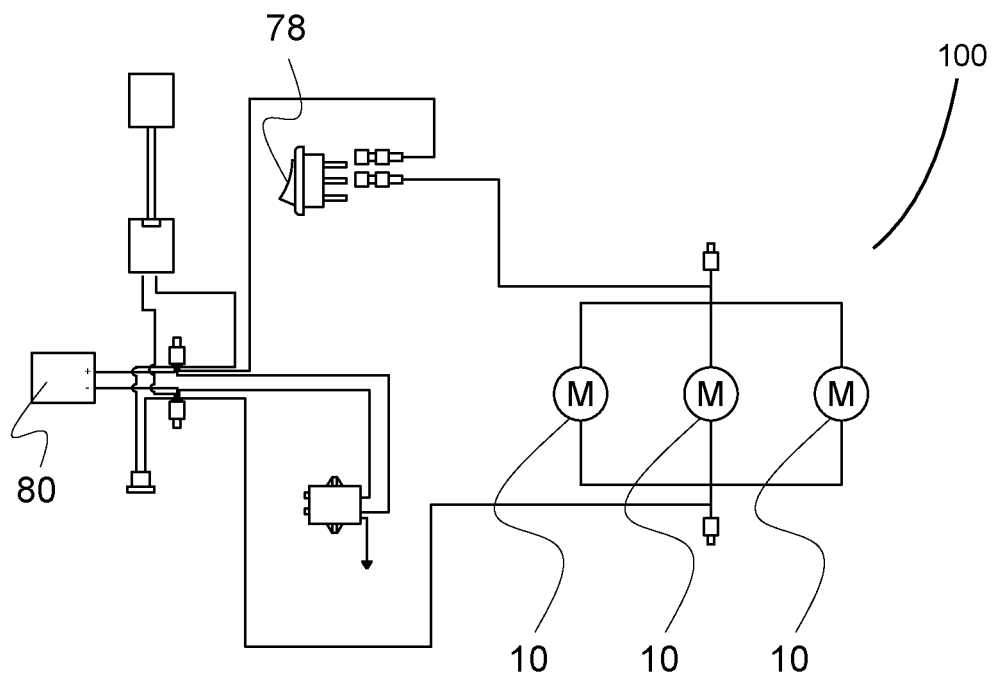
FIG. 14 is a circuitry diagram of a three-motor embodiment.
Figure 15:
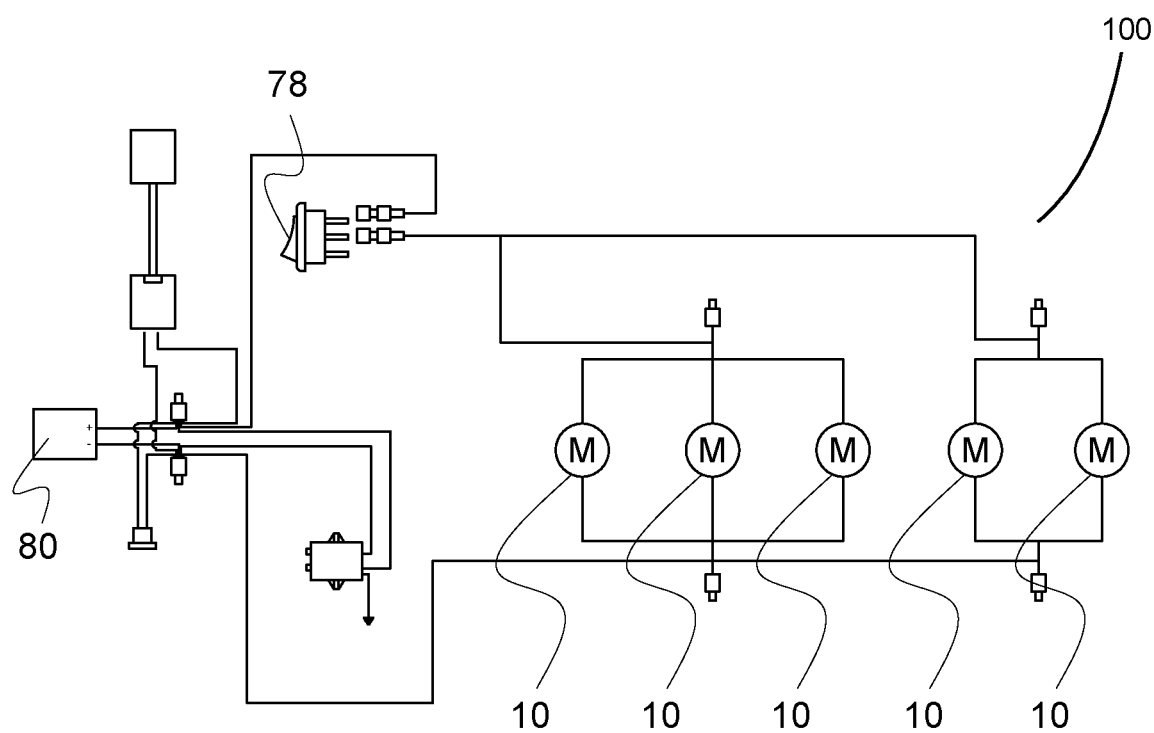
FIG. 15 is a circuitry diagram of a five-motor embodiment.

FIGS. 14 and 15 are examples of circuitry diagrams for various rotisserie systems. FIG. 14 is a circuitry diagram of a three-motor embodiment. As may be noticed, the diagram includes a plurality of motor assemblies 10 wired to a battery 80 as a power source. The power switch 78 allows the motors of the motor assemblies 10 to turn off and on as necessary. With similar elements to FIG. 14, FIG. 15 is a circuitry diagram of another embodiment with five motors. The primary difference is the wiring to the fourth and fifth motor assemblies. As such, the motors can be controlled independently or in a group, which is a benefit of the system.

The disclosure herein is for a skewer rotation system 100 for a rotisserie cooking system 200. The skewer rotation system 100 comprises a plurality of independent motor system assemblies 10 horizontally mounted to a barrier wall 12 of an inner cooking chamber 14 of a rotisserie grill system 200, wherein each motor system assembly 10 in the plurality of motor system assemblies is mounted to the barrier wall 12 by a bracket 16 spacing each motor system 10 from direct contact to the barrier wall 12, anchoring each motor system assembly 10 axially horizontal, as can be appreciated in FIG. 10.

Further, each of the motor system assemblies 10 has a body 18. The body incorporates a motor 20, horizontal motor shaft 22, gear assembly 24, rotatable connecting shaft 26, and a cylindrical skewer engagement couple 28 engaged with the rotatable connecting shaft 26, as may be seen in FIGS. 10 and 13.

Each of the motor system assemblies 10 in the plurality of motor system assemblies is mounted on an exterior side (in the mechanical components chamber 44) of the barrier wall 12 of the inner cooking chamber 14 of the rotisserie grill system. The barrier wall 12 includes a plurality of apertures 30 to allow the cylindrical skewer connector 28 to extend through the aperture 30 to allow engagement of each motor system assembly 10 with a complemental skewer 32. The rotatable connecting shaft 26 extends horizontally from the gear assembly 24 into the inner cooking chamber 14, beyond each of the apertures 30 in the plurality of apertures in the barrier wall 12. Each of the rotatable connecting shafts 26 is capped with the cylindrical skewer engagement couple 28.

Each of the motor system assemblies 10 is self contained in an independent enclosures, body 18, corresponding to each motor system assembly 10 wherein each of the motor system assemblies 10 also includes an enclosure isolating the gear assembly 36, wherein the gear assembly 24 influences the torque of the motor 20 to achieve a predetermined speed of rotation and power requirements. The independent enclosure 36 of the gear assembly 24 also protects the gears from particulates that may disrupt operation if wedged in during operation and rotation of gears. The motor 20 and gear assembly are configured to be capable of achieving rotating in a range of 2.5-4 rotations per minute.

In some embodiments, each of the motors 20 is capable of running from a 11.1V 2.6 Ah power source, such a rechargeable battery 80, or plug-in transformer. In other embodiments, the motors 20 are capable of running off of line-voltage, such as 120V or 240V.

In some embodiments, each of the motor system assemblies 10 is configured to rotate its own independent skewer 32 that it has been complementally paired with. In other embodiments, at least two of the motor system assemblies 10 are configured to run independently, thereby allowing variable speed and operation. In further embodiments, each of the motor system assemblies 10 are configured to run independently, thereby allowing variable speed and operation.

Because of the high heat the system involves, the system uses flame retardant wiring 38 capable of withstanding high-heat of at least 300 degrees Fahrenheit. Each of the motor system assemblies 10 is constructed of materials capable of operation in temperatures of at least 300 degrees Fahrenheit. Each of the motors 20 is capable of operation in temperatures of at least 300 degrees Fahrenheit.

The disclosure herein also provides for a rotisserie cooking system 200. This system includes a main rotisserie cooking system body defining an inner cooking chamber 14 and an enclosed mechanical components chamber 44. The inner cooking chamber 14 is defined by sidewalls 46, top 48 and bottom walls 50, a front door 52, and a barrier wall 12 separating the cooking chamber 14 and the enclosed mechanical chamber 44. The system also includes a heating element 54, which can range from natural fuel, such as propane or natural gas, to electrical heating elements such as an infrared source. In addition, a plurality of removable skewers 32, and a skewer rotation system 100 as described above, are included within the system.

Further, most embodiments include a rechargeable battery 80 for powering the motor 20 of the motor system assemblies 10. A power inlet for a power supply is also necessary in each embodiment to power the motors 20. In other embodiments, the motors 20 may require a 110-120V AC input. Further embodiments of the motors 20 may require a 220-240V AC input.

In some embodiments, a warming compartment 82 in the top wall 48 of the main body of the rotisserie cooking system 200 is included. The heat from the inner cooking chamber 14 also heats a bottom surface 86 of the warming compartment 82, thereby negating the need for a separate heating element for the warming compartment.

While there has been shown and described above the preferred embodiment of the instant invention it is to be appreciated that the invention may be embodied otherwise than is herein specifically shown and described and that, within the invention, certain changes may be made in the form and arrangement of the parts without departing from the underlying ideas or principles of this invention as set forth in the Claims appended herewith.

We claim:
1. A skewer rotation system for a rotisserie cooking system, comprising:
a plurality of independent motor system assemblies horizontally mounted to a barrier wall of an inner cooking chamber of a rotisserie grill system, wherein each motor system assembly in said plurality of motor system assemblies is mounted to said barrier wall by a bracket spacing each motor system from direct contact to said barrier wall, anchoring each motor system assembly axially horizontal;
each of said motor system assemblies having a body, wherein said body incorporates a motor, horizontal motor shaft, gear assembly, rotatable connecting shaft, and a cylindrical skewer engagement couple engaged with said rotatable connecting shaft;
a plurality of apertures in said barrier wall to allow said cylindrical skewer connector to extend through said aperture to allow engagement of each motor system assembly with a complimental skewer;
said rotatable connecting shaft extending horizontally from said gear assembly, extending into said inner cooking chamber, beyond each of said apertures in said plurality of apertures in said barrier wall, wherein each of said rotatable connecting shafts is capped with said cylindrical skewer engagement couple; and
each of said motor system assemblies in said plurality of motor system assemblies mounted on an exterior side of said barrier wall of said inner cooking chamber of said rotisserie grill system.

2. The skewer rotation system as recited in claim 1, wherein each of said motor system assemblies is self contained in an independent enclosures corresponding to each motor system assembly wherein each of said motor system assemblies also includes an enclosure isolating said gear assembly, wherein said gear assembly influences the torque of the motor to achieve a predetermined speed of rotation and power requirements.

3. The skewer rotation system as recited in claim 2, wherein said motor and gear assembly are configured to be capable of achieving rotating in a range of 2.5-4 rotations per minute.

4. The skewer rotation system as recited in claim 1, wherein each of said motor system assemblies is configured to rotate its own independent skewer that it has been complementally paired with.

5. The skewer rotation system as recited in claim 1, wherein at least two of said motor system assemblies are configured to run independently, thereby allowing variable speed and operation.

6. The skewer rotation system as recited in claim 1, wherein each of said motor system assemblies are configured to run independently, thereby allowing variable speed and operation.

7. The skewer rotation system as recited in claim 1, further comprising:
flame retardant wiring capable of withstanding high-heat of at least 300 degrees Fahrenheit.

8. The skewer rotation system as recited in claim 1, wherein each of said motor system assemblies is constructed of materials capable of operation in temperatures in excess of 300 degrees Fahrenheit.

9. The skewer rotation system as recited in claim 1, wherein each of said motors is capable of operation in temperatures in excess of 300 degrees Fahrenheit.

10. The skewer rotation system as recited in claim 1, wherein each of said motors is capable of running from a 11.1V 2.6 Ah power source.

11. The skewer rotation system as recited in claim 10, wherein said power source is a rechargeable battery.

12. The skewer rotation system as recited in claim 1, wherein each of said motors is capable of running from a 110V 120V AC power source.

13. The skewer rotation system as recited in claim 1, wherein each of said motors is capable of running from a 220V 240V AC power source.

14. A rotisserie cooking system, comprising:
a main rotisserie cooking system body defining an inner cooking chamber and an enclosed mechanical components chamber;
said inner cooking chamber having sidewalls, top and bottom walls, a front door, and a barrier wall separating said cooking chamber and said enclosed mechanical chamber;
a heating element;
a plurality of removable skewers; and
a skewer rotation system having:
a plurality of independent motor system assemblies horizontally mounted to said barrier wall of said inner cooking chamber of said rotisserie grill system, wherein each motor system assembly in said plurality of motor system assemblies is mounted to said barrier wall by a bracket spacing each motor system from direct contact to said barrier wall, anchoring each motor system assembly axially horizontal;
each of said motor system assemblies having a body, wherein said body incorporates a motor, horizontal motor shaft, gear assembly, rotatable connecting shaft, and a cylindrical skewer engagement couple engaged with said rotatable connecting shaft;
a plurality of apertures in said barrier wall to allow said cylindrical skewer connector to extend through said aperture to allow engagement of each motor system assembly with a complimental skewer;
said rotatable connecting shaft extending horizontally from said gear assembly, extending into said inner cooking chamber, beyond each of said apertures in said plurality of apertures in said barrier wall, wherein each of said rotatable connecting shafts is capped with said cylindrical skewer engagement couple; and
each of said motor system assemblies in said plurality of motor system assemblies mounted on an exterior side of said barrier wall of said inner cooking chamber of said rotisserie grill system.

15. The rotisserie cooking system as recited in claim 14, further comprising:
a rechargeable battery for powering said motor of said motor system assemblies.

16. The rotisserie cooking system as recited in claim 14, further comprising:
a warming compartment in the top wall of said main body of said rotisserie cooking system, wherein the heat from the inner cooking chamber also heats a bottom surface of said warming compartment.

17. The rotisserie cooking system as recited in claim 14, wherein each of said motor system assemblies is self contained in an independent enclosures corresponding to each motor system assembly wherein each of said motor system assemblies also includes an enclosure isolating said gear assembly, wherein said gear assembly influences the torque of the motor to achieve a predetermined speed of rotation and power requirements.

18. The rotisserie cooking system as recited in claim 17, wherein said motor and gear assembly are configured to be capable of achieving rotating in a range of 2.5-4 rotations per minute.

19. The rotisserie cooking system as recited in claim 14, wherein each of said motor system assemblies is configured to rotate its own independent skewer that it has been complementally paired with.

20. The rotisserie cooking system as recited in claim 14, wherein at least two of said motor system assemblies are configured to run independently, thereby allowing variable speed and operation.

21. The rotisserie cooking system as recited in claim 14, wherein each of said motor system assemblies are configured to run independently, thereby allowing variable speed and operation.

* * * * *